United States Patent
Humphries et al.

(10) Patent No.: US 9,678,899 B2
(45) Date of Patent: Jun. 13, 2017

(54) METHOD AND APPARATUS FOR PROVIDING MEMORY PROTECTION

(71) Applicants: Gerard William Humphries, Glasgow (GB); Alistair Paul Robertson, Glasgow (GB)

(72) Inventors: Gerard William Humphries, Glasgow (GB); Alistair Paul Robertson, Glasgow (GB)

(73) Assignee: NXP USA, INC., Austin, TX (US)

( * ) Notice: Subject to any disclaimer, the term of this patent is extended or adjusted under 35 U.S.C. 154(b) by 235 days.

(21) Appl. No.: 14/247,909

(22) Filed: Apr. 8, 2014

(65) Prior Publication Data
US 2015/0286584 A1   Oct. 8, 2015

(51) Int. Cl.
*G06F 12/00* (2006.01)
*G06F 12/14* (2006.01)

(52) U.S. Cl.
CPC ...... *G06F 12/1441* (2013.01); *G06F 12/1491* (2013.01)

(58) Field of Classification Search
CPC .......... G06F 12/1441; G06F 12/1491
See application file for complete search history.

(56) References Cited

U.S. PATENT DOCUMENTS

| | | | |
|---|---|---|---|
| 2003/0140238 A1* | 7/2003 | Turkboylari | G06F 21/575 713/193 |
| 2006/0129707 A1* | 6/2006 | Matsuda | G06F 12/0866 710/22 |
| 2006/0248318 A1* | 11/2006 | Zohner | G06F 13/1663 712/225 |
| 2012/0215991 A1 | 8/2012 | Moyer | |

FOREIGN PATENT DOCUMENTS

| | | |
|---|---|---|
| EP | 2461251 A1 | 6/2012 |
| WO | 2006072756 A1 | 7/2006 |

* cited by examiner

*Primary Examiner* — Gurtej Bansal

(57) ABSTRACT

A method for providing memory protection within a signal processing system comprises receiving a memory access signal comprising at least one instruction memory region (IMR) indication. The IMR indication comprises an indication of a region of memory from which a memory access instruction was fetched, execution of said memory access instruction having resulted in the generation of the received memory access signal. The method further comprises comparing the IMR indication for the received memory access signal to at least one permitted memory region (PMR) indication for a target address of the received memory access signal, and determining whether a memory access being attempted by the memory access signal is permitted based at least partly on the comparison of the IMR indication for the received memory access signal to the PMR indication for the target address of the received memory access signal.

20 Claims, 6 Drawing Sheets

METHOD AND APPARATUS FOR PROVIDING MEMORY PROTECTION

FIELD OF THE INVENTION

This invention relates to method and apparatus for providing memory protection, and in particular to a method and apparatus for providing memory protection within a signal processing system.

BACKGROUND OF THE INVENTION

Memory protection is a way to control memory access rights within a computer system, and is a part of most modern operating systems. Conventionally, an operating system (OS) uses process IDs (PIDs) to secure locations of memory for a particular process, limiting read and write to those locations of memory to the process with that specific PID. This conventional approach to memory protection is usually secure as most application code will run in user mode and be unable to alter the PIDs of the processes being executed. However, in certain applications a core may run with some or all of its code within supervisor mode, providing an opportunity for the PID of a process to be altered and thus leave areas of memory vulnerable to unknown processes. Furthermore, errant software in a fault condition could feasibly update the PID if operating in supervisor mode.

For devices used within security and safety focused applications, such as automotive, industrial and aerospace applications, the highest level of security and safety is required. For such security/safety focused applications such vulnerability in conventional memory protection is undesirable.

SUMMARY OF THE INVENTION

The present invention provides a memory protection unit, a signal processing system and a method of providing memory protection within a signal processing system as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Figure 1:
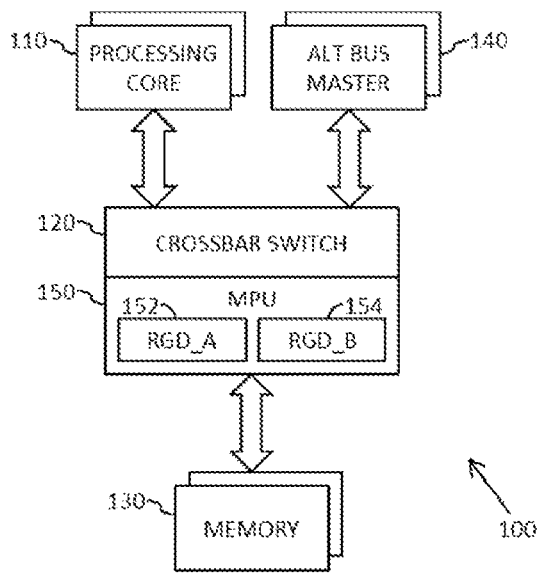
FIG. 1 illustrates a simplified block diagram of an example of a signal processing system.

The present invention will now be described with reference to the accompanying drawings. However, it will be appreciated that the present invention is not limited to the specific examples herein described and illustrated in the accompanying drawings. Furthermore, because the illustrated embodiments of the present invention may for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

According to some examples of a first aspect of the present invention, there is provided a memory protection unit arranged to receive a memory access signal comprising at least one instruction memory region (IMR) indication, the at least one IMR indication comprising an indication of a region of memory from which a memory access instruction was fetched, execution of said memory access instruction having resulted in the generation of the received memory access signal. The memory protection unit is further arranged to compare the at least one IMR indication for the received memory access signal to at least one permitted memory region (PMR) indication for a target address of the received memory access signal, and determine whether a memory access being attempted by the memory access signal is permitted based at least partly on the comparison of the at least one IMR indication for the received memory access signal to the at least one PMR indication for the target address of the received memory access signal.

In this manner, by determining whether a memory access being attempted is permitted based on the comparison of an IMR indication for a received memory access signal to one or more PMR indication(s) for the target address of the received memory access signal, protected regions of memory may be linked to specific regions of memory containing program instructions. As such, access to the protected regions of memory may be restricted to instructions fetched from (or outside of) the linked regions of memory. Advantageously, such a defined association between a memory region containing instructions and a protected memory region not limited to a process ID scheme to provide protection to the protected memory region. As a result, the scheme proposed herein, whereby protected regions of memory may be linked to specific regions of memory containing program instructions, does not suffer from the same vulnerability as conventional process ID based protection schemes where process IDs may be altered by programme code executing in a supervisor mode of the processing core(s).

In some optional embodiments, the memory protection unit may comprise at least one access regional descriptor component, the at least one access regional descriptor component comprising at least one regional descriptor defining at least one region of memory with which the at least one access regional descriptor component is associated and at least one PMR indication, wherein the memory protection unit may be arranged to compare the at least one IMR indication for the received memory access signal to the at least one PMR indication of the at least one access regional descriptor component and to determine whether a memory access being attempted by the memory access signal is permitted based at least partly on the comparison of the at least one IMR indication for the received memory access signal to the at least one PMR indication of the at least one access regional descriptor component, if the target address of the received memory access signal corresponds to the region of protected memory with which the at least one access regional descriptor component is associated.

In some optional embodiments, the at least one regional descriptor of the at least one access regional descriptor component may comprise at least one start address and at least one end address for the at least one region of protected memory with which the at least one access regional descriptor component is associated.

In some optional embodiments, the at least one PMR indication of the at least one access regional descriptor component may comprise at least one start address and at least one end address defining at least one PMR.

In some optional embodiments, the at least one access regional descriptor component may further comprise at least one access rights descriptor from a group comprising at least one of:
  at least one process ID;
  at least one bus master ID;
  at least one bus master privilege level indication; and
  at least one access type indication.

Furthermore, the memory protection unit may be arranged to determine whether a memory access being attempted by the memory access signal is permitted further based at least partly on the at least one access rights descriptor of the at least one access regional descriptor component, if the target address of the received memory access signal corresponds to the region of protected memory with which the at least one access regional descriptor component is associated.

In some optional embodiments, the memory protection unit may comprise at least one access evaluation module operably coupled to the at least one access regional descriptor component and arranged to receive the memory access signal comprising the at least one IMR indication, and compare the at least one IMR indication for the received memory access signal to the at least one PMR indication of the at least one access regional descriptor component. Wherein the memory protection unit may be arranged to determine whether a memory access being attempted by the memory access signal is permitted based at least partly on the comparison of the at least one IMR indication for the received memory access signal to the at least one PMR indication of the at least one access regional descriptor component by the at least one access evaluation module, if the target address of the received memory access signal corresponds to the region of protected memory associated with the at least one access regional descriptor component operably coupled thereto.

In some optional embodiments, the at least one access evaluation module may be arranged to output an access violation signal indicating that the memory access being attempted by the received memory accesses signal is not permitted, if the at least one IMR indication for the received memory access signal does not match a PMR as defined by the at least one PMR indication of the at least one access regional descriptor component.

In some optional embodiments, the at least one access evaluation module may be arranged to output a hit signal indicating that the received memory access signal is relevant to that access evaluation module, if the target address of the received memory access signal corresponds to the region of protected memory associated with the at least one access regional descriptor component operably coupled thereto.

In some optional embodiments, the memory protection unit may be arranged to set at least one bit in at least one error register for at least one bus master device, if at least one evaluation component outputs a hit signal indicating that the received memory access signal is relevant to that access evaluation module and an access violation signal indicating that the memory access being attempted by the received memory access signal is not permitted.

In some optional embodiments, the IMR indication comprises at least one of:
  a regional descriptor identifier;
  a memory block identifier; and
  at least a part of a memory address.

In some optional embodiments, the memory protection unit may be further arranged to receive an instruction fetch signal from at least one bus master device requesting an instruction be fetched from memory, and return an IMR indication to the at least one bus master device with the requested instruction fetched from memory, the IMR indication comprising an indication of a region of memory from which the requested instruction was fetched.

In some optional embodiments, the memory protection unit may comprise at least one instruction regional descriptor component comprising at least one regional descriptor defining at least one region of memory with which the at least one instruction regional descriptor component is associated. Wherein the memory protection unit may be arranged to compare the address from which the requested instruction is fetched to the at least one regional descriptor for the at least one instruction regional descriptor component, and to return as the IMR indication to the at least one bus master device a regional descriptor identifier corresponding to the at least one instruction regional descriptor component, if the address from which the requested instruction is fetched corresponds to the regional descriptor for the at least one instruction regional descriptor component.

In some optional embodiments, the at least one regional descriptor of the at least one instruction regional descriptor component may comprise at least one start address and at least one end address for at least one region of memory.

In some optional embodiments, the memory protection unit may comprise at least one instruction fetch evaluation component operably coupled to the at least one instruction regional descriptor component and arranged to receive the instruction fetch signal requesting an instruction be fetched from memory, and compare the address from which the requested instruction is fetched to the regional descriptor for the at least one instruction regional descriptor component, and to return as the IMR indication to the at least one bus master device a regional descriptor identifier for the at least one regional descriptor, if the address from which the requested instruction is fetched corresponds to the regional descriptor for the at least one instruction regional descriptor component.

In some optional embodiments, the at least one instruction fetch evaluation component may be arranged to output a hit signal, if the address from which the requested instruction is fetched corresponds to the regional descriptor for the at least one instruction regional descriptor component.

In some optional embodiments, the memory protection unit may be arranged to return as the IMR indication to the at least one bus master device a regional descriptor identifier for the at least one instruction regional descriptor component, if the at least one instruction fetch evaluation component operably coupled to the at least one instruction regional descriptor component outputs a hit signal.

In some optional embodiments, the memory protection unit may be arranged to return as the IMR indication to the at least one bus master device a memory block identifier from which the requested instruction was fetched.

In some optional embodiments, the memory protection unit may be arranged to return as the IMR indication at least a part of a memory address from which the requested instruction was fetched.

In some optional embodiments, the memory protection unit may be implemented within an integrated circuit device comprising at least one die within a single integrated circuit package.

According to some examples of a second aspect of the present invention, there is provided a signal processing system comprising at least one memory protection unit according to the first aspect of the present invention.

According to some examples of a third aspect of the present invention, there is provided a method of providing memory protection within a signal processing system. The method comprises receiving a memory access signal comprising at least one instruction memory region (IMR) indication, the at least one IMR indication comprising an indication of a region of memory from which a memory access instruction was fetched, execution of said memory access instruction having resulted in the generation of the received memory access signal. The method further comprises comparing the at least one IMR indication for the received memory access signal to at least one permitted memory region (PMR) indication for a target address of the received memory access signal, and determining whether a memory access being attempted by the memory access signal is permitted based at least partly on the comparison of the at least one IMR indication for the received memory access signal to the at least one PMR indication for the target address of the received memory access signal.

In some optional embodiments, the method may further comprise receiving an instruction fetch signal from at least one bus master device requesting an instruction be fetched from memory and returning an IMR indication to the at least one bus master device with the requested instruction fetched from memory, the IMR indication comprising an indication of a region of memory from which the requested instruction was fetched.

Referring now to FIG. 1, there is illustrated a simplified block diagram of an example of a signal processing system 100, such as a microprocessor, microcontroller, System on Chip (SoC), or the like. The signal processing system 100 comprises one or more processing module(s), such as the processing cores indicated generally at 110. Each processing module 110 is arranged to execute program code comprising program instructions. The signal processing system 100 further comprises at least one interconnect component, such as crossbar switch 120, and at least one memory component, such as the memory elements indicated generally at 130. In some examples, the signal processing system 100 may further comprise one or more alternative bus master device(s) 140 other than the processing module(s) 110. Such a bus master device 140 may comprise, for example, a Direct Memory Access (DMA) component or the like. The interconnect component 120 is arranged to operably couple the various components of the signal processing system 100 together, allowing the various components to communicate with one another, and for data to be conveyed between the various components. In particular, the interconnect component 120 enables the processing module(s) 110 and the alternative bus master devices 140 to access memory space within the memory element(s) 130. In this manner, the processing module(s) 110 and the alternative bus master devices 140 may be able to read and/or write data from/to regions of memory within the memory element(s) 130.

The signal processing system 100 further comprises at least one memory protection unit (MPU) 150, arranged to provide memory protection for at least a part of the memory space within the memory element(s) 130. In the example illustrated in FIG. 1, the MPU 150 is operably coupled between the interconnect component 120 and the memory element(s) 130. In this manner, a memory access signal from a processing module 110 or alternative bus master device 140 is routed to the memory element(s) 130 via the MPU 150. Upon receipt of such a memory access signal, the MPU 150 is arranged to determine whether the memory access being attempted is permitted, for example based upon one or more defined parameters, and to block the memory access (e.g. by generating an error message) if it is determined that the memory access is not permitted.

A memory access signal is typically generated upon execution of a memory access instruction by one of the processing modules 110, such as a read instruction or a write instruction. Such an instruction will previously have been fetched from memory 130.

In accordance with some examples of the present invention, the MPU 150 is arranged to receive a memory access signal comprising an instruction memory region (IMR) indication. As described in more detail below, such an IMR indication comprises an indication of a region of memory 130 from which the memory access instruction corresponding to the received memory access signal (i.e. the execution of which resulted in the received memory access signal being generated) was fetched. The MPU 150 is further arranged to compare the IMR indication of the received memory access signal to one or more permitted memory region (PMR) indication(s) for the target address of the received memory access signal, and to determine whether the memory access being attempted is permitted based at least partly on the comparison of the IMR indication of the received memory access signal to the PMR indication(s) for the target address.

The IMR indication may comprise any suitable form of indication of the region of memory 130 from which the respective memory access instruction was fetched. In some examples the IMR indication may comprise a register descriptor (RGD) identifier. For example, and as described in greater detail below, the MPU 150 may comprise one or more instruction RGD component(s), such as RGD_A 152, comprising at least one regional descriptor defining at least one region of memory 130 with which the instruction RGD component 152 is associated. In this manner, when an instruction fetch signal is received by the MPU 150, a target address of the received instruction fetch signal may be compared to the at least one regional descriptor of the instruction RGD component 152. If the target address of the received instruction fetch signal corresponds to the at least one regional descriptor of the instruction RGD component 152 (i.e. is within a region of memory 130 with which the instruction RGD component 152 is associated), an IMR indication comprising an RGD identifier for the instruction RGD component 152 may be returned with the fetched instruction. Upon subsequent execution of the instruction, if the execution of the instruction results in a memory access signal being generated (for example if the instruction comprises a read or write instruction), the IMR indication corresponding to that instruction may be propagated to the MPU 150 along with the memory access signal.

In some alternative examples, the IMR indication may comprise a memory block identifier, such as a Flash block identifier, for the block of memory from which the instruction was fetched. In some further alternative examples, the IMR indication may comprise at least a part of an address in memory from which the instruction was fetched. In this manner, for each of these alternative examples a more direct indication of the region of memory 130 from which the memory access instruction was fetched may be used as the IMR indication.

The propagation of side-band information alongside instruction fetch and memory access signals is commonplace within signal processing system designs. Examples of conventional side-band information may include, by way of example only, process IDs (PIDs), master device IDs, privilege level indications, etc.

As such, in some examples of the present invention it is contemplated that an IMR indication may be propagated through the signal processing system 100 as side-band information alongside the respective instruction fetch and memory access signals.

Upon receipt of a memory access signal comprising an IMR indication (for example with the IMR indication being propagated alongside the memory access signal as side-band information), the MPU 150 of FIG. 1 is arranged to compare the IMR indication for the received memory access signal to at least one PMR indication for a target address of the received memory access signal. In the example illustrated in FIG. 1, the MPU 150 may comprise one or more access RGD component(s), such as RGD_B 154. The (or each) access RGD component 154 may comprise one or more regional descriptor(s) defining at least one region of memory 130 with which the respective access regional descriptor component 154 is associated. The (or each) access RGD component 154 may further comprise at least one PMR indication. The MPU 150 may thus be arranged to compare the IMR indication for the received memory access signal to the PMR indication(s) of the access RDG component(s) 154 and to determine whether a memory access being attempted by the memory access signal is permitted based at least partly on the comparison of the IMR indication for the received memory access signal to the PMR indication(s) of an access RDG component(s) 154, if the target address of the received memory access signal corresponds to the region of protected memory with which that access RDG component(s) 154 is associated.

In this manner, by determining whether a memory access being attempted is permitted based on the comparison of an IMR indication for a received memory access signal to one or more PMR indication(s) for the target address of the received memory access signal, protected regions of memory may be linked to specific regions of memory containing program instructions. As such, access to the protected regions of memory may be restricted to instructions fetched from the linked regions of memory. Advantageously, such a defined association between a memory region containing instructions and a protected memory region does not rely on a process ID scheme to provide protection to the protected memory region. As a result, the scheme proposed herein, whereby protected regions of memory may be linked to specific regions of memory containing program instructions, does not suffer from the same vulnerability as conventional process ID based protection schemes where process IDs may be altered by programme code executing in a supervisor mode of the processing core(s).

Figure 2:
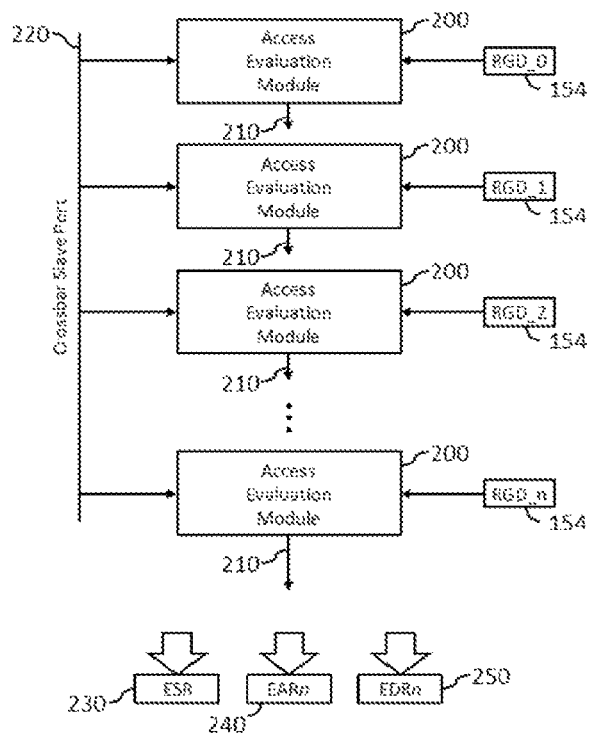
FIG. 2 illustrates a simplified block diagram of an example of part of a memory protection unit.

In some examples, the MPU 150 may comprise one or more access evaluation module(s) operably coupled to the access RGD component(s) 154 and arranged to receive memory access signals comprising IMR indications, and compare the IMR indications for the received memory access signals to PMR indication(s) of the access RGD component(s) 154. For example, and as illustrated in FIG. 2, the MPU 150 may comprise a plurality of access evaluation modules 200. Each access evaluation module 200 may be operably coupled to the (or each) memory component slave port 220 of the crossbar switch 120, such that memory access signals for the memory component 130 are received by the access evaluation modules 200 from the memory component slave port(s) 220 of the crossbar switch 120. Each access evaluation module 200 is further operably coupled to an access RGD component 154, and arranged to compare IMR indications for received memory access signals to PMR indication(s) of the respective access RGD components 154. Each access evaluation modules 200 may then output an indication 210 of whether a memory access being attempted by the memory access signal is permitted based at least partly on the comparison of the IMR indication for the received memory access signal to the PMR indication(s) of the respective access RGD components 154. The MPU 150 may then determine whether a memory access being attempted is permitted based at least partly on the indications 210 output by the access evaluation modules 200.

Figure 3:
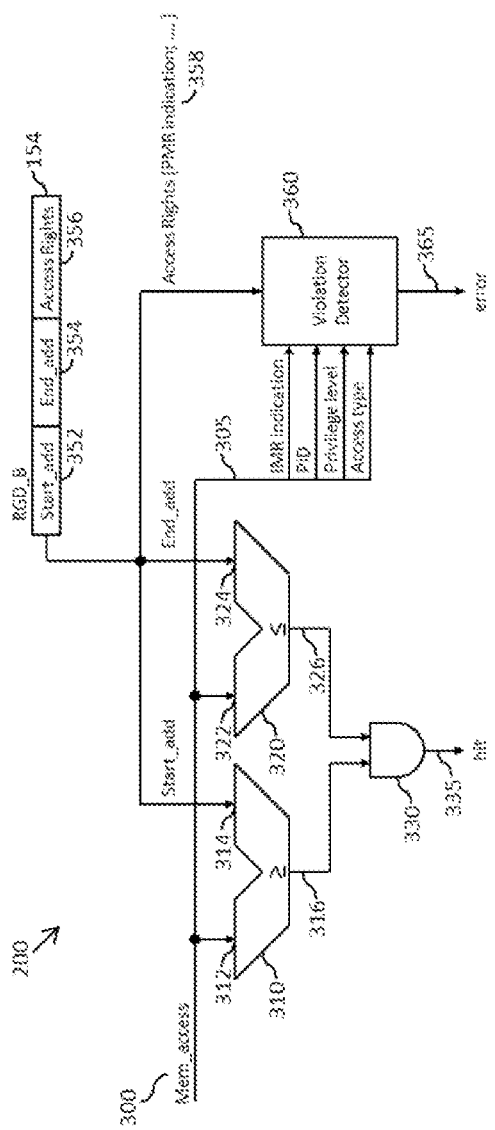
FIG. 3 illustrates a simplified block diagram of an example of an access evaluation module.

Referring now to FIG. 3, there is illustrated a simplified block diagram of an example of an access evaluation module 200. The access evaluation module 200 receives a memory access signal 300, for example from a memory component slave port 220 of the crossbar switch 120.

Figure 4:
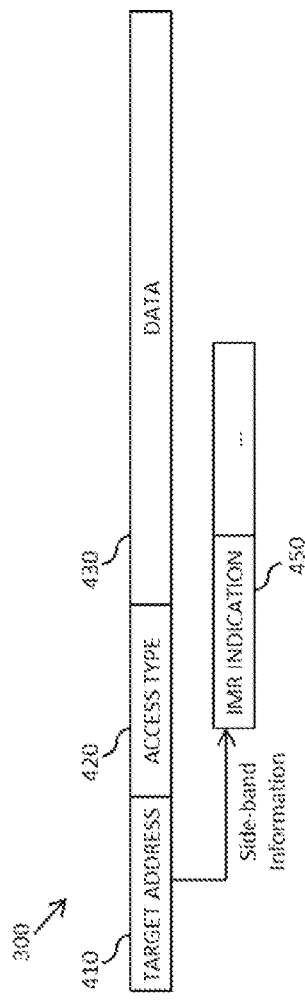
FIG. 4 illustrates a simplified example of a memory access signal.

FIG. 4 illustrates a simplified example of a memory access signal 300. In the example illustrated in FIG. 4, the memory access signal 300 comprises a data write instruction signal attempting to write data to a target address in memory 130. As such, the memory access signal 300 illustrated in FIG. 4 comprises a target address portion 410 identifying an address in memory 130 at which the attempted memory access is to be performed, an access type indication 420 identifying the type of access to be performed (e.g. a data read access, a data write access, an instruction fetch read access, etc), and optionally a data portion 430 containing data to be written to memory at the target address in the case of a write access. In the illustrated example, the memory access signal 300 further comprises side-band information comprising an IMR indication for the memory access signal 300. Such side-band information may be "wrapped" into a bus transaction and sent over the bus (crossbar switch 120) as conventional bus transactions utilizing a bus transfer protocol. Alternatively, such side-band information may be communicated via hardwired, dedicated lines.

Referring back to FIG. 3, the access evaluation module 200 is operably coupled to an access RGD component 154. In the example illustrated in FIG. 3, the access RGD component 154 comprises a start address descriptor 352 and an end address descriptor 354 which together define a region of memory 130 with which the access regional descriptor component 154 is associated. The access RGD component 154 further comprises one or more access rights descriptors 356, the one or more access rights descriptors 356 comprising at least one PMR indication 358 for the region of memory 130 with which the access regional descriptor component 154 is associated.

In the illustrated example, the access evaluation module 200 comprises a first comparison component 310 arranged to receive at a first input 312 thereof the target address 410 of the memory access signal 300. A second input 314 of the first comparison component 310 is arranged to receive the start address descriptor 352 from the access RGD component 154. The first comparison component 310 is arranged to compare the target address 410 received at its first input 312 with the start address descriptor 352 received at its second input 314, and to output an indication 316 of whether the target address 410 of the received memory access signal 300 is greater than or equal to the start address descriptor 352 defined within the access RGD component 154. Specifically in the illustrated example, the first comparison component 310 is arranged to output a logical '1' if the target address 410 of the received memory access signal 300 is greater than or equal to the start address descriptor 352 defined within the access RGD component 154, and a logical '0' if the target address 410 of the received memory access signal 300 is less than the start address descriptor 352 defined within the access RGD component 154.

In the illustrated example, the access evaluation module 200 further comprises a second comparison component 320 arranged to receive at a first input 322 thereof the target address 410 of the memory access signal 300. A second input 324 of the second comparison component 320 is arranged to receive the end address descriptor 354 from the access RGD component 154. The second comparison component 320 is arranged to compare the target address 410 received at its first input 322 with the end address descriptor 354 received at its second input 324, and to output an indication 326 of whether the target address 410 of the received memory access signal 300 is less than the end address descriptor 354 defined within the access RGD component 154. Specifically in the illustrated example, the second comparison component 320 is arranged to output a logical '1' if the target address 410 of the received memory access signal 300 is less than or equal to the end address descriptor 354 defined within the access RGD component 154, and a logical '0' if the target address 410 of the received memory access signal 300 is greater than the end address descriptor 354 defined within the access RGD component 154.

The signals 316, 326 output by the comparison components 320 are provided to respective inputs of an AND gate 330. In this manner, the AND gate 330 is arranged to output a 'hit' signal 335 comprising a logical '1' if the target address 410 of the received memory access signal 300 is within the address range defined by the start and end address descriptors 352, 354 defined within the access RGD component 154. As such, the 'hit' signal 335 output by the AND gate 330 provides an indication as to whether the target address 410 of the received memory access signal 300 corresponds to the region of protected memory with which the access RGD component 154 is associated.

The access evaluation module 200 illustrated in FIG. 3 further comprises a violation detector component 360. The violation detector component 360 is arranged to determine whether the memory access being attempted by the received memory access signal 300 is permitted in accordance with the access rights descriptors 356 defined within the access RGD component 154. In the illustrated example, the violation detector component 360 is arranged to receive the access rights descriptors 356 defined within the access RGD component 154, along with information 305 contained within the received memory access signal 300. Such memory access signal information 305 comprises at least the IMR indication for the received memory access signal 300, and may comprise further information such as, by way of example, one or more of:
  a process ID (PID) for the process responsible for the received memory access signal;
  a bus master device ID for the bus master device from which the received memory access signal was received;
  a privilege level indication for the bus master device from which the received memory access signal was received;
  an access type;
  etc.

The violation detector component 360 may then compare the memory access signal information 305 with the access rights descriptors 356 from the access RGD component 154 to determine whether the memory access being attempted by the received memory access signal 300 is permitted. In particular, in the illustrated example the violation detector component 360 may be arranged to compare the IMR indication 450 for the received memory access signal 300 to the PMR indication 358 within the access rights descriptors 356 from the access RGD component 154 and to determine whether a memory access being attempted by the memory access signal 300 is permitted based at least partly on the comparison of the IMR indication 450 for the received memory access signal 300 to the PMR indication 358 within the access rights descriptors 356 from the access RGD component 154. For example, the PMR indication 358 within the access rights descriptors 356 from the access RGD component 154 may comprise a start address and an end address defining a permitted memory region, and the violation detector component 360 may be arranged to compare the IMR indication 450 for the received memory access signal 300 to the start and end addresses of the PMR indication 358 to determine whether the region of memory from which the memory access instruction responsible for the received memory access signal 300 was fetched is within the permitted memory region defined by the start and end addresses of the PMR indication 358.

The access rights descriptors 356 from the access RGD component 154 may comprise further access permission parameters such as, by way of example, one or more of:
  one or more process IDs (PIDs);
  one or more bus master device IDs;
  one or more privilege level indications;
  one or more access types;
  etc.

As such, the violation detector component 360 may further be arranged to determine whether a memory access being attempted by the received memory access signal 300 is permitted further based at least partly on a comparison of the memory access signal information 305 to one or more of these further access permission parameters.

The violation detector component 360 is arranged to output an access violation (error) signal 365 indicating whether the memory access being attempted by the received memory access signal 300 is permitted or not based on a comparison of the memory access signal information 305 to the access rights descriptors 356 from the access RGD component 154, and in particular based (at least partly) on a comparison of the IMR indication within the memory access signal information 305 to the PMR indication within the access rights descriptors 356 from the access RGD component 154.

In some examples, the PMR indication 358 may define a region of memory whereby instructions fetched from said defined region of memory may be permitted to access the region of memory associated with the RGD component 154 (as defined by start address descriptor 352 and end address descriptor 354). As such, if the IMR indication 450 indicates that the memory access instruction corresponding to a received memory access signal 300 (i.e. the execution of which resulted in the received memory access signal being generated) was fetched from outside of the region of memory defined by the PMR indication 358, the violation detector component 360 would output an access violation signal 365 indicating that the memory access being attempted is not permitted. Conversely, if the IMR indication 450 indicates that the memory access instruction corresponding to a received memory access signal 300 was fetched from within the region of memory defined by the PMR indication 450, the violation detector component 360 would output an access violation signal 365 indicating that the memory access being attempted is permitted.

In some alternative examples, the PMR indication 358 may define a region of memory whereby instructions fetched from outside said defined region of memory may be permitted to access the region of memory associated with the RGD component 154. As such, if the IMR indication 450 indicates that the memory access instruction corresponding to a received memory access signal 300 was fetched from outside of the region of memory defined by the PMR indication 358, the violation detector component 360 would output an access violation signal 365 indicating that the memory access being attempted is permitted. Conversely, if the IMR indication 450 indicates that the memory access instruction corresponding to a received memory access signal 300 was fetched from within the region of memory defined by the PMR indication 450, the violation detector component 360 would output an access violation signal 365 indicating that the memory access being attempted is not permitted.

As described above, the access evaluation module 200 is arranged to output a hit signal indicating that the received memory access signal 300 is relevant to that access evaluation module 200, if the target address 410 of the received memory access signal 300 corresponds to the region of protected memory associated with the access RGD component 154 (i.e. is within the address range defined by the start and end address descriptors 352, 354 within the access RGD component 154 in the illustrated example). Furthermore, the access evaluation module 200 is arranged to output an access violation (error) signal 365 indicating whether the memory access being attempted by the received memory access signal 300 is permitted or not, based on the access rights descriptors 356 from the access RGD component 154.

Referring back to FIG. 2, if one of the access evaluation modules 200 detects an access violation (i.e. if an access evaluation module 200 outputs a hit signal indicating that the received memory access signal 300 is relevant to that access evaluation module 200 and an access violation signal 365 indicating that the memory access being attempted by the received memory access signal 300 is not permitted), the MPU 150 may be arranged to set one or more bits in one or more error register for the bus master device responsible for the received memory access signal 300. For example, if one of the access evaluation modules 200 detects an access violation the MPU 150 may be arranged to set a bit within an error status register (ESR) 230 corresponding to the bus master device responsible for the received memory access signal indicating that an access violation has been detected.

The MPU 150 may further be arranged to capture the target address for the received memory access signal 300 within an error address register 240. The MPU 150 may further be arranged to capture further details about the attempted memory access within an error detail register 250.

As mentioned above with reference to FIG. 1, in some examples the IMR indication 450 may comprise an RGD identifier for an instruction RGD component. For example, the MPU 150 may comprise one or more instruction RGD component(s), such as RGD_A 152, comprising at least one regional descriptor defining at least one region of memory 130 with which the instruction RGD component 152 is associated. In this manner, when an instruction fetch signal is received by the MPU 150, a target address of the received instruction fetch signal may be compared to the at least one regional descriptor of the instruction RGD component 152. If the target address of the received instruction fetch signal corresponds to the at least one regional descriptor of the instruction RGD component 152 (i.e. is within a region of memory 130 with which the instruction RGD component 152 is associated), an IMR indication comprising an RGD identifier for the instruction RGD component 152 may be returned with the fetched instruction.

In some examples, the MPU 150 may comprise one or more instruction fetch evaluation module(s) operably coupled to the instruction RGD component(s) 152 and arranged to receive instruction fetch signals from one or more bus master devices 110, 140 requesting an instruction be fetched from memory 130, and return an instruction memory region indications to the respective bus master device(s) 110, 140 with the requested instruction fetched from memory, an instruction memory region indication comprising an indication of a region of memory from which the requested instruction was fetched.

Figure 5:
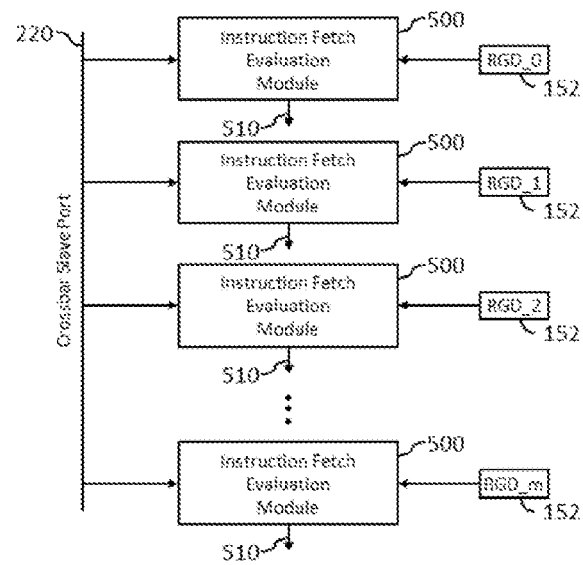
FIG. 5 illustrates a simplified block diagram of an example of an alternative part of a memory protection unit.

For example, and as illustrated in FIG. 5, the MPU 150 may comprise a plurality of instruction fetch evaluation modules 500. Each instruction fetch evaluation module 500 may be operably coupled to the (or each) memory component slave port 220 of the crossbar switch 120, such that instruction fetch signals for the memory component 130 are received by the instruction fetch evaluation modules 500 from the memory component slave port(s) 220 of the crossbar switch 120. Each instruction fetch evaluation module 500 is further operably coupled to an instruction RGD component 152, and arranged to compare an address from which an instruction is fetched in response to an instruction fetch signal to at least one region of memory defined by one or more regional descriptor(s) for the respective instruction RGD component 152. In this manner, when an instruction fetch signal is received by the MPU 150, each instruction fetch evaluation module 500 may compare a target address of the received instruction fetch signal to the region(s) of memory defined by the regional descriptor(s) for the respective instruction RGD component 152. Each instruction fetch evaluation module 500 may further be arranged to output an indication 510 of whether an address from which an instruction is fetched matches at least one region of memory defined by the regional descriptor(s) for the respective instruction RGD component 152.

If an instruction fetch evaluation module 500 outputs an indication 510 that the address from which an instruction has been fetched matches a region of memory defined by the regional descriptor(s) for an instruction RGD component 152 operably coupled thereto, the MPU 150 may then return to the relevant bus master device 110, 140 an IMR indication comprising a regional descriptor identifier for instruction RGD component 152 corresponding to the instruction fetch evaluation module 500 outputting said indication.

Figure 6:
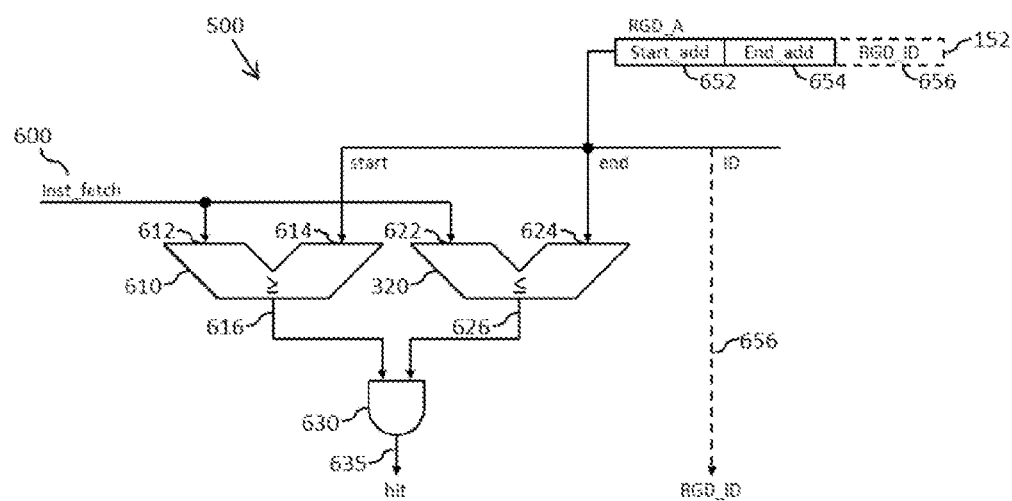
FIG. 6 illustrates a simplified block diagram of an example of an instruction fetch evaluation module.

Referring now to FIG. 6, there is illustrated a simplified block diagram of an example of an instruction fetch evaluation module 500. The instruction fetch evaluation module 500 receives an instruction fetch signal 600, for example from a memory component slave port 220 of the crossbar switch 120. The instruction fetch evaluation module 500 is operably coupled to an instruction RGD component 152. In the example illustrated in FIG. 6, the instruction RGD component 152 comprises a start address descriptor 652 and an end address descriptor 654 which together define a region of memory 130 with which the instruction RGD component 152 is associated. The instruction RGD component 152 may further comprise an RGD identifier 656.

In the illustrated example, the instruction fetch evaluation module 500 comprises a first comparison component 610 arranged to receive at a first input 612 thereof a target address of the instruction fetch signal 600. A second input 614 of the first comparison component 610 is arranged to receive the start address descriptor 652 from the instruction RGD component 152. The first comparison component 610 is arranged to compare the target address received at its first input 612 with the start address descriptor 652 received at its second input 614, and to output an indication 616 of whether the target address of the received instruction fetch signal 600 is greater than or equal to the start address descriptor 652 defined within the instruction RGD component 152. Specifically in the illustrated example, the first comparison component 610 is arranged to output a logical '1' if the target address of the received instruction fetch signal 600 is greater than or equal to the start address descriptor 652 defined within the instruction RGD component 152, and a logical '0' if the target address of the received instruction fetch signal 600 is less than the start address descriptor 652 defined within the instruction RGD component 152.

In the illustrated example, the instruction fetch evaluation module 500 further comprises a second comparison component 620 arranged to receive at a first input 622 thereof the target address of the instruction fetch signal 600. A second input 624 of the second comparison component 620 is arranged to receive the end address descriptor 654 from the instruction RGD component 152. The second comparison component 620 is arranged to compare the target address received at its first input 622 with the end address descriptor 654 received at its second input 624, and to output an indication 626 of whether the target address of the received instruction fetch signal 600 is less than the end address descriptor 654 defined within the instruction RGD component 152. Specifically in the illustrated example, the second comparison component 620 is arranged to output a logical '1' if the target address of the received instruction fetch signal 600 is less than or equal to the end address descriptor 654 defined within the instruction RGD component 152, and a logical '0' if the target address of the received instruction fetch signal 600 is greater than the end address descriptor 654 defined within the instruction RGD component 152.

The signals 616, 626 output by the comparison components 620 are provided to respective inputs of an AND gate 630. In this manner, the AND gate 630 is arranged to output a 'hit' signal 635 comprising a logical '1' if the target address of the received instruction fetch signal 600 is within the address range defined by the start and end address descriptors 652, 654 within the instruction RGD component 152. As such, the 'hit' signal 635 output by the AND gate 630 provides an indication as to whether the target address of the received instruction fetch signal 600 corresponds to the region of memory with which the instruction RGD component 152 is associated.

The instruction fetch evaluation module 500 illustrated in FIG. 6 is further arranged to output the RGD identifier 656 from the instruction RGD component 152.

Referring back to FIG. 5, if one of the instruction fetch evaluation modules 500 outputs a hit signal 635 indicating that the target address of a received instruction fetch signal 600 corresponds to the region of memory with which one of the instruction RGD components 152 is associated, the MPU 150 may be arranged to return as an IMR indication for the fetched instruction the regional descriptor identifier 656 for the instruction RGD component 152 corresponding to the instruction fetch evaluation module 500 outputting said hit signal 635. For example, such an IMR indication may be returned by way of side-band information alongside the fetched instruction.

As previously described, the IMR indication (e.g. RGD identifier) returned with the fetched instruction may subsequently be used to determine whether a memory access being attempted by a memory access signal resulting from the fetched instruction being executed is permitted based at least partly on the comparison of the IMR indication to one or more PMR indication(s) for the target address of the received memory access signal.

In this manner, instructions within one or more region(s) of memory 130 defined within the instruction RGD component(s) 152 may be provided with a particular access permission status. For example, instructions located within the region(s) of memory 130 defined by the instruction RGD component(s) 152 may be provided with a 'positive' access permission status whereby memory accesses to one or more region(s) of protected memory may only be permitted for instructions located within the region(s) of memory 130 defined by the regional descriptor(s) 652, 654 of the (one or more) instruction RGD component(s) 152. Conversely, instructions located within the region(s) of memory 130 defined by the regional descriptor(s) of the instruction RGD component(s) 152 may be provided with a 'negative' access permission status whereby memory accesses to one or more region(s) of protected memory may only be permitted for instructions located outside of the region(s) of memory 130 defined by the regional descriptor(s) of the (one or more) instruction RGD component(s) 152. In this manner, upon receipt of an instruction fetch signal from a bus master device (e.g. a processing core 110 or alternative bus master device 140) requesting an instruction be fetched from memory, the MPU 150 may be arranged to compare the address from which the requested instruction is fetched to the regional descriptor(s) of the instruction RGD component 152, and to return to the relevant bus master device an IMR indication for the fetched instruction comprising an RGD identifier corresponding to the instruction RGD component 152, if the address from which the requested instruction is fetched corresponds to the regional descriptor for the instruction RGD component 152.

In the example illustrated in FIG. 6, the instruction RGD component 152 comprises a regional descriptor identifier field 656 in which an identifier for that instruction RGD component 152 may be programmed, and which may be used by the MPU 150 as the IMR indication to be returned with the fetched instruction. In some alternative examples, the MPU 150 may alternatively be arranged to derive an RGD identifier to be used as an IMR indication based on, say, a register offset for the instruction RGD component, or the like.

In some examples, it is contemplated that the access RGD components 154 and/or the instruction RGD components 152 may comprise lockable registers whereby the RGD component registers may be initially configured, for example upon system power up, and the locked until a subsequent system reset. This would permit the association between a memory region containing instructions and a protected memory region to be statically defined, thereby prevent malicious software from deliberately circumventing the protection by reconfiguring the RGD components 152, 154.

Figure 7:
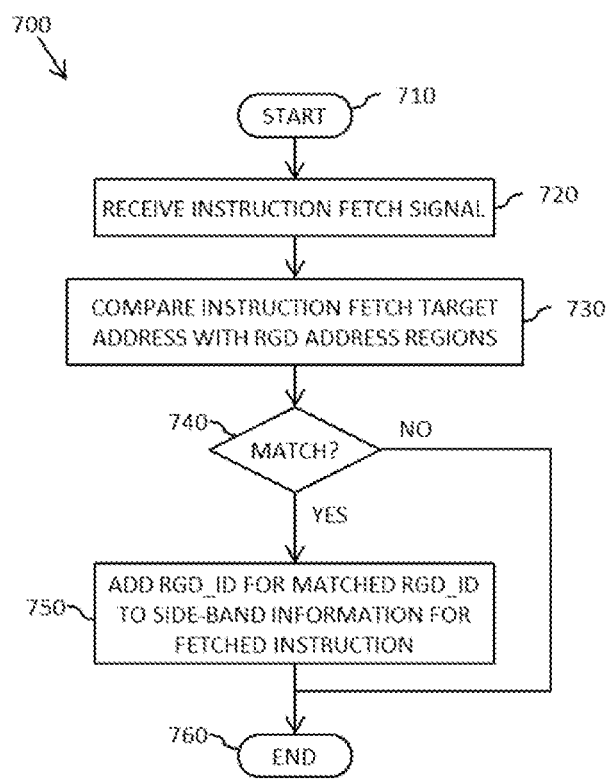
FIG. 7 illustrates a simplified flowchart of an example of a part of a method of providing memory protection within a signal processing system.

Referring now to FIG. 7, there is illustrated a simplified flowchart 700 of an example of a part of a method of providing memory protection within a signal processing system, such as may be performed by the MPU 150 of FIG. 1. This part of the method starts at 710, and moves on to 720 where an instruction fetch signal is received. Next, at 730, a target address of the received instruction fetch signal is compared to one or more instruction RGD memory address regions. It is then determined whether the target address of the received instruction fetch signal is a match to at least one instruction RGD memory address region. If it is determined that the target address of the received instruction fetch signal is not a match to at least one instruction RGD memory address region, the method then ends at 760. Conversely, if it is determined that the target address of the received instruction fetch signal is a match to at least one instruction RGD memory address region, the method moves on to 750 where an RGD identifier for the instruction RGD of the memory address region of which the target address of the received instruction fetch signal is a match is returned along with the fetched instruction to provide an IMR indication for the fetched instruction. In particular in the illustrated example, the RGD identifier is added to side-band information for the fetched instruction. The method then ends, at 760.

Figure 8:
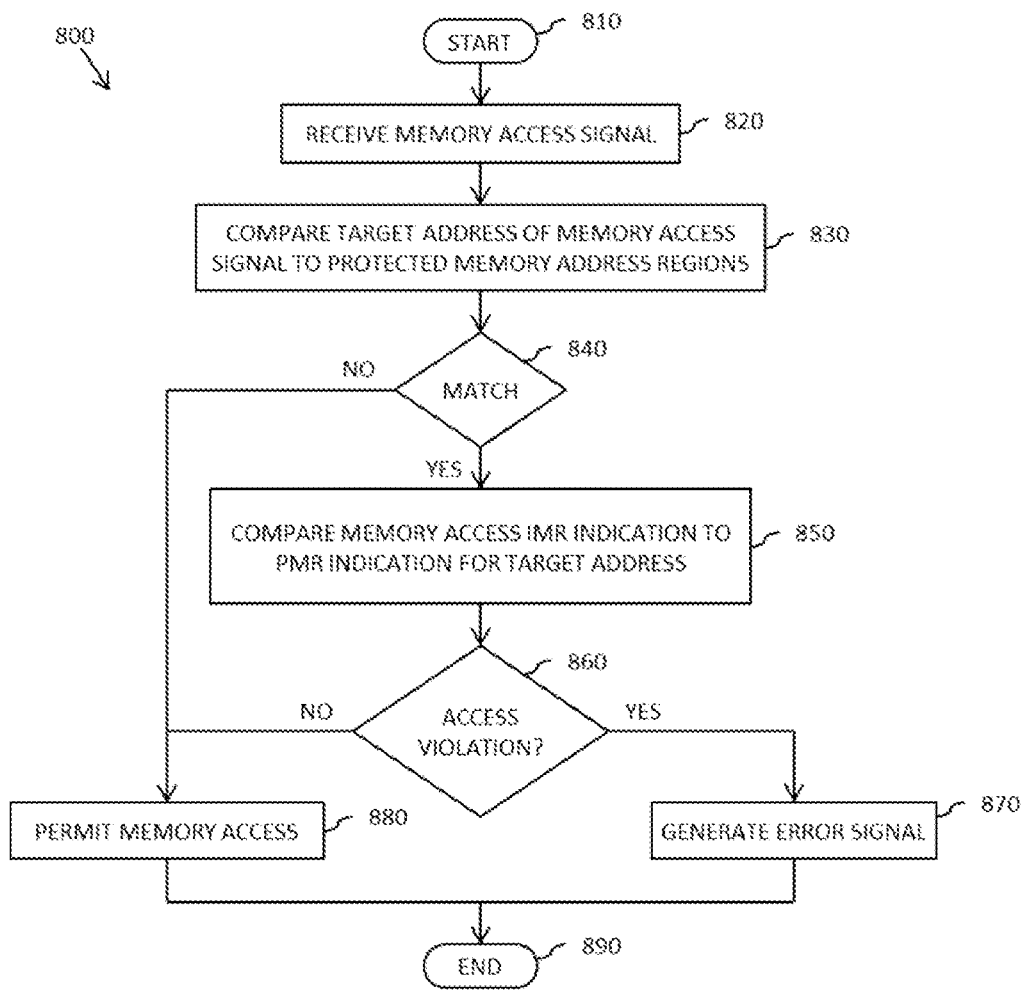
FIG. 8 illustrates a simplified flowchart of an example of a further part of a method of providing memory protection within a signal processing system.

Referring now to FIG. 8 there is illustrated a simplified flowchart 800 of an example of a further part of a method of providing memory protection within a signal processing system, such as may be performed by the MPU 150 illustrated in FIG. 1. This part of the method starts at 810, and moves on to 820 where a memory access signal is received, such as the memory access signal 300 illustrated in FIG. 4. Next, at 830, a target address of the received memory access signal is compared to one or more protected memory address regions. For example, the target address of the received memory access signal 300 may be compared to start and end addresses defining one or more regions of protected memory. Next, at 840, it is determined whether the target address of the received memory access signal corresponds to the region(s) of protected memory defined by said start and end addresses. If it is determined that the target address of the received memory access signal does not correspond to a region of protected memory, the method moves on to 880 and the memory access is permitted. The method then ends at 890. Conversely, if it is determined that the target address of the received memory access signal does correspond to a region of protected memory, the method moves on to 850 where an IMR indication for the received memory access signal is compared to a PMR indication for the region of protected memory to which the target address relates. Next, at 860, it is determined whether the attempted memory access comprises an access violation based at least partly on the comparison of the IMR indication for the received memory access signal to the PMR indication for the region of protected memory to which the target address relates. If it is determined that the attempted memory access does not comprise an access violation, the method moves on to 880 and the memory access is permitted. The method then ends at 890. Conversely, if it is determined that the attempted memory access does comprise an access violation, the method moves on to 870 and a memory access error signal is generated. The method then ends, at 890.

Figure 9:
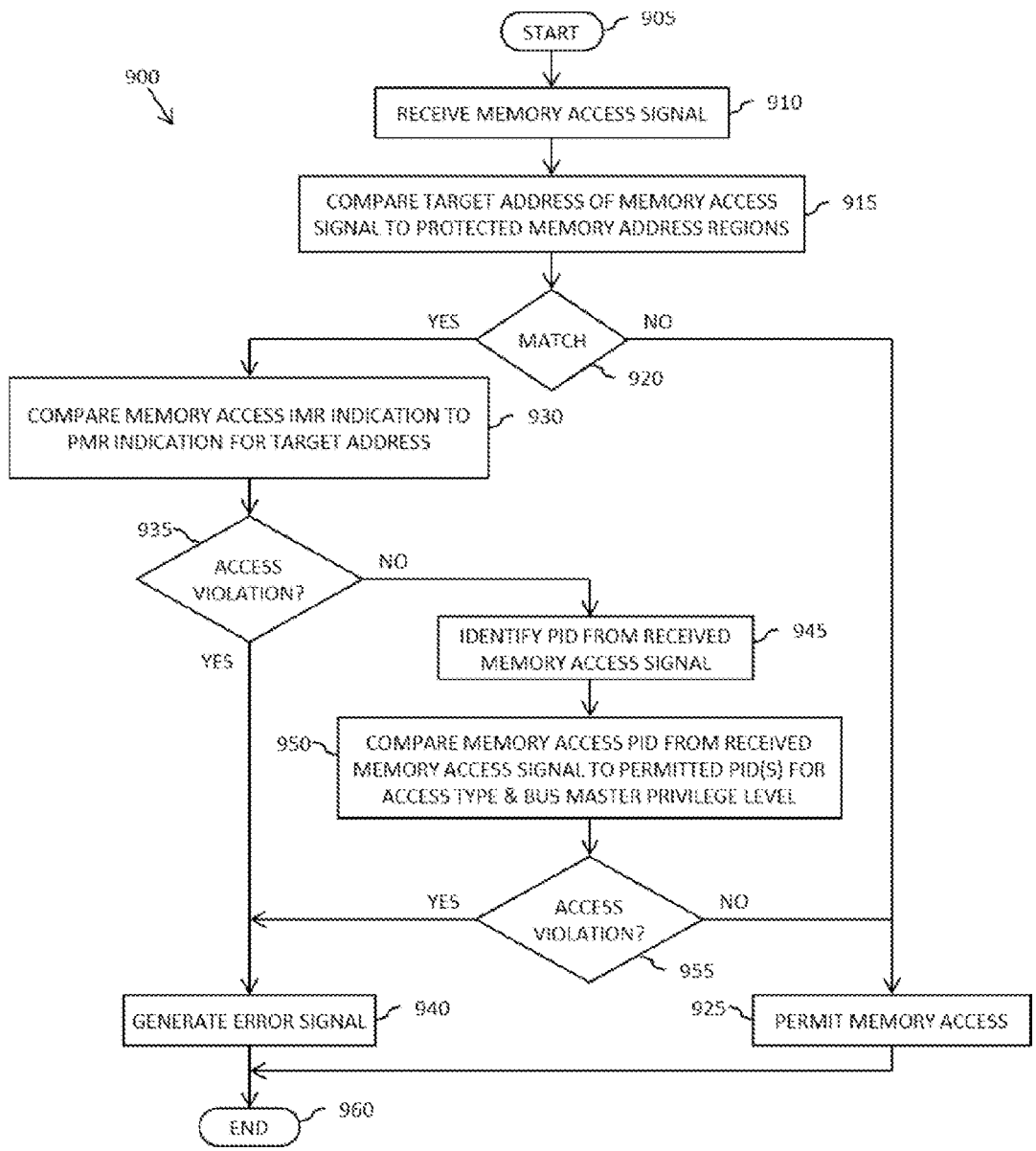
FIG. 9 illustrates a simplified flowchart of an example of an alternative further part of a method of providing memory protection within a signal processing system.

Referring now to FIG. 9 there is illustrated a simplified flowchart 900 of an alternative example of a further part of a method of providing memory protection within a signal processing system, such as may equally be performed by the MPU 150 illustrated in FIG. 1. This part of the method starts at 905, and moves on to 910 where a memory access signal is received, such as the memory access signal 300 illustrated in FIG. 4. Next, at 915, a target address of the received memory access signal is compared to one or more protected memory address regions. For example, the target address of the received memory access signal 300 may be compared to start and end addresses defining one or more regions of protected memory. Next, at 920, it is determined whether the target address of the received memory access signal corresponds to the region(s) of protected memory defined by said start and end addresses. If it is determined that the target address of the received memory access signal does not correspond to a region of protected memory, the method moves on to 925 and the memory access is permitted. The method then ends at 960. Conversely, if it is determined that the target address of the received memory access signal does correspond to a region of protected memory, the method moves on to 930 where an IMR indication for the received memory access signal is compared to a PMR indication for the region of protected memory to which the target address relates. Next, at 935, it is determined whether the attempted memory access comprises an access violation according to the comparison of the IMR indication for the received memory access signal to the PMR indication for the region of protected memory to which the target address relates. If it is determined that the attempted memory access does comprise an access violation, the method moves on to 940 and a memory access error signal is generated. The method then ends, at 960. Conversely, if it is determined that the attempted memory access does not comprise an access violation at 935, the method in FIG. 9 moves on to 945 where a process ID (PID) is identified for the received memory access signal. The PID is then compared to permitted PIDs for the particular access type, bus master privilege level, etc. of the received memory access signal, at 950. Next, at 955, it is determined whether the attempted memory access comprises an access violation according to the comparison of the PID for the received memory access signal to permitted PIDs performed at 950. If it is determined that the attempted memory access does comprise an access violation, the method moves on to 940 and a memory access error signal is generated. The method then ends, at 960. Conversely, if it is determined that the attempted memory access does not comprise an access violation at 955, the method moves on to 925 and the memory access is permitted. The method then ends at 960.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Furthermore, the terms 'assert' or 'set' and 'negate' (or 'de-assert' or 'clear') are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A memory protection unit, arranged to:

receive a memory access signal comprising at least one instruction memory region, IMR, indication, the at least one IMR indication comprising an indication of a region of memory from which the memory access instruction was fetched, execution of said memory access instruction having resulted in the generation of the received memory access signal;

compare the at least one IMR indication for the received memory access signal to at least one permitted memory region, PMR, indication for a target address of the received memory access signal and output a hit signal when the target address corresponds to a PMR;

determine whether a memory access being attempted by the memory access signal is permitted based at least partly on the comparison of the at least one IMR indication for the received memory access signal to the at least one PMR indication for the target address of the received memory access signal and output an access violation signal when the attempted memory access of the memory access signal is not permitted; and determine whether the memory access signal, for a permitted memory access, is further permitted based at least partly on a comparison of a process ID for the memory access to permitted process ID(s) for an access type and bus master privilege level.

2. The memory protection unit of claim 1 implemented within an integrated circuit device comprising at least one die within a single integrated circuit package.

3. The memory protection unit of claim 1, wherein the memory protection unit is further arranged to:
receive an instruction fetch signal from at least one bus master device requesting an instruction be fetched from memory; and
return an IMR indication to the at least one bus master device with the requested instruction fetched from memory, the IMR indication comprising an indication of a region of memory from which the requested instruction was fetched.

4. The memory protection unit of claim 3, wherein the memory protection unit is arranged to return as the IMR indication to the at least one bus master device a memory block identifier from which the requested instruction was fetched.

5. The memory protection unit of claim 3, wherein the memory protection unit is arranged to return as the IMR indication at least a part of a memory address from which the requested instruction was fetched.

6. The protection memory unit of claim 1, wherein the memory protection unit comprises at least one instruction regional descriptor component comprising at least one regional descriptor defining at least one region of memory with which the at least one instruction regional descriptor component is associated;
wherein the memory protection unit is arranged to compare the address from which the requested instruction is fetched to the at least one regional descriptor for the at least one instruction regional descriptor component, and to return as the IMR indication to at least one bus master device a regional descriptor identifier corresponding to the at least one instruction regional descriptor component, if the address from which the requested instruction is fetched corresponds to the regional descriptor for the at least one instruction regional descriptor component.

7. The protection memory unit of claim 6, wherein the at least one regional descriptor of the at least one instruction regional descriptor component comprises at least one start address and at least one end address for at least one region of memory.

8. The memory protection unit of claim 6, wherein the memory protection unit comprises at least one instruction fetch evaluation component operably coupled to the at least one instruction regional descriptor component and arranged to:
receive the instruction fetch signal requesting an instruction be fetched from memory; and
compare the address from which the requested instruction is fetched to the regional descriptor for the at least one instruction regional descriptor component; and to return as the IMR indication to the at least one bus master device a regional descriptor identifier for the at least one regional descriptor, if the address from which the requested instruction is fetched corresponds to the regional descriptor for the at least one instruction regional descriptor component.

9. The memory protection unit of claim 8, wherein the at least one instruction fetch evaluation component is arranged to output a hit signal, if the address from which the requested instruction is fetched corresponds to the regional descriptor for the at least one instruction regional descriptor component.

10. The memory protection unit of claim 9, wherein the memory protection unit is arranged to return as the IMR indication to the at least one bus master device a regional descriptor identifier for the at least one instruction regional descriptor component, if the at least one instruction fetch evaluation component operably coupled to the at least one instruction regional descriptor component outputs a hit signal.

11. The memory protection unit of claim 1, wherein the memory protection unit comprises at least one access regional descriptor component, the at least one access regional descriptor component comprising:
at least one regional descriptor defining at least one region of memory with which the at least one access regional descriptor component is associated; and
at least one PMR indication,
wherein the memory protection unit is arranged to compare the at least one IMR indication for the received memory access signal to the at least one PMR indication of the at least one access regional descriptor component and to determine whether a memory access being attempted by the memory access signal is permitted based at least partly on the comparison of the at least one IMR indication for the received memory access signal to the at least one PMR indication of the at least one access regional descriptor component, if the target address of the received memory access signal corresponds to the region of protected memory with which the at least one access regional descriptor component is associated.

12. The memory protection unit of claim 11, wherein the at least one regional descriptor of the at least one access regional descriptor component comprises at least one start address and at least one end address for the at least one region of protected memory with which the at least one access regional descriptor component is associated.

13. The memory protection unit of claim 11, wherein the at least one PMR indication of the at least one access regional descriptor component comprises at least one start address and at least one end address defining at least one PMR.

14. The memory protection unit of claim 11, wherein the at least one access regional descriptor component further comprises at least one access rights descriptor from a group comprising at least one of:
at least one bus master ID;
and
at least one access type indication.

15. The memory protection unit of claim 11, wherein the memory protection unit comprises at least one access evaluation module operably coupled to the at least one access regional descriptor component and arranged to:
receive the memory access signal comprising the at least one IMR indication; and
compare the at least one IMR indication for the received memory access signal to the at least one PMR indication of the at least one access regional descriptor component,
wherein the memory protection unit is arranged to determine whether a memory access being attempted by the memory access signal is permitted based at least partly on the comparison of the at least one IMR indication for the received memory access signal to the at least one PMR indication of the at least one access regional descriptor component by the at least one access evaluation module, if the target address of the received memory access signal corresponds to the region of protected memory associated with the at least one access regional descriptor component operably coupled thereto.

16. The memory protection unit of claim 15, wherein the at least one access evaluation module is arranged to output an access violation signal indicating that the memory access being attempted by the received memory accesses signal is not permitted, if the at least one IMR indication for the received memory access signal does not match a PMR as defined by the at least one PMR indication of the at least one access regional descriptor component.

17. The memory protection unit of claim 15, wherein the at least one access evaluation module is arranged to output the hit signal indicating that the received memory access signal is relevant to that access evaluation module, if the target address of the received memory access signal corresponds to the region of protected memory associated with the at least one access regional descriptor component operably coupled thereto.

18. The memory protection unit of claim 17, wherein the memory protection unit is arranged to set at least one bit in at least one error register for at least one bus master device, if at least one evaluation component outputs the hit signal indicating that the received memory access signal is relevant to that access evaluation module and the access violation signal indicating that the memory access being attempted by the received memory access signal is not permitted.

19. A signal processing system comprising at least one memory protection unit according to claim 1.

20. A method of providing memory protection within a signal processing system, the method comprising:
receiving a memory access signal comprising at least one instruction memory region, IMR, indication, the at least one IMR indication comprising an indication of a region of memory from which a memory access instruction was fetched, execution of said memory access instruction having resulted in the generation of the received memory access signal;
comparing the at least one IMR indication for the received memory access signal to at least one permitted memory region, PMR, indication for a target address of the received memory access signal and outputting a hit signal when the target address corresponds to a PMR;
determining whether a memory access being attempted by the memory access signal is permitted based at least partly on the comparison of the at least one IMR indication for the received memory access signal to the at least one PMR indication for the target address of the received memory access signal and outputting an access violation signal when the attempted memory access of the memory access signal is not permitted; and
determining whether the memory access signal for a permitted memory access is further permitted based at least partly on a comparison of a process ID for the memory access to permitted process ID(s) for an access type and bus master privilege level.

\* \* \* \* \*